Oct. 11, 1938.                G. M. CALL                2,132,983
                                TRAP
                           Filed Feb. 7, 1938
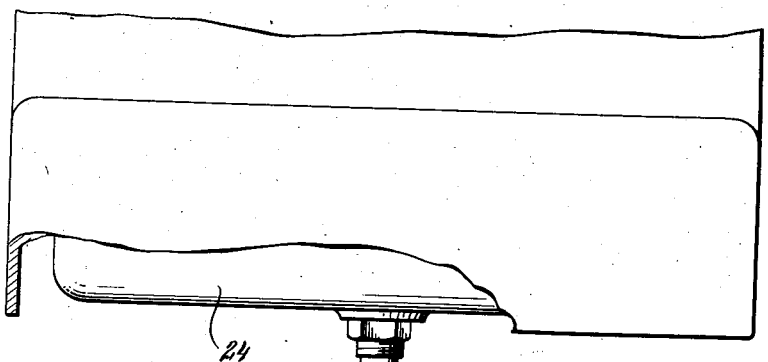
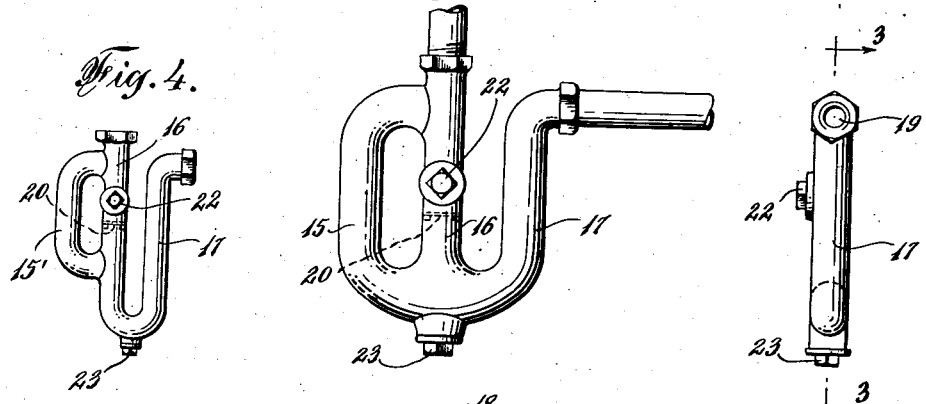
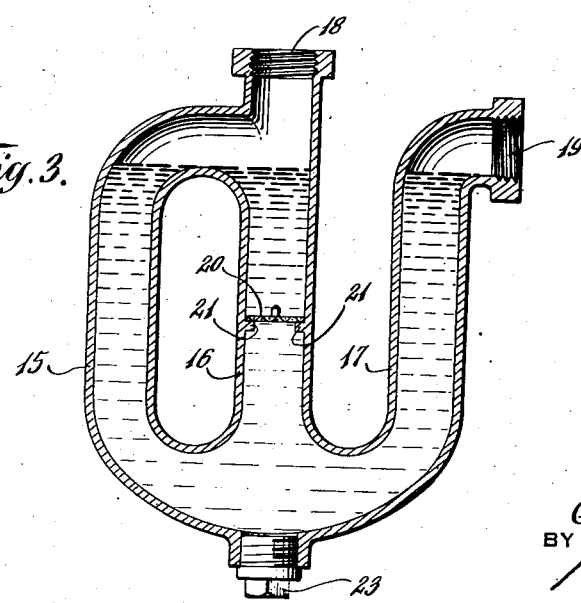
Fig. 1.
Fig. 2.
Fig. 3.
Fig. 4.
INVENTOR
George M. Call
BY
ATTORNEY Patented Oct. 11, 1938

2,132,983

UNITED STATES PATENT OFFICE 2,132,983

TRAP

George M. Call, New York, N. Y.

Application February 7, 1938, Serial No. 189,163

2 Claims. (Cl. 182—23)

My present invention relates to plumbing appliances called traps, and more particularly to the kind used in sewer and drain piping systems.

The principal object of this invention is to provide a trap of the type mentioned, of novel and improved construction, which maintains a constant water seal, retains all solid matter entering same, keeps under water all such collected material until removed, provides a constantly free passage from its intake opening to its discharge opening, is easily cleaned, and which is cheap to manufacture, is of simple design and efficient in use.

Other objects will become manifest as this description proceeds.

In the accompanying drawing, forming part of this application, similar characters of reference indicate corresponding parts in all the views.

Fig. 1 shows an embodiment of my invention interposed in the drain pipe leading from a sink.

Fig. 2 is a side view of said trap shown in Fig. 1.

Fig. 3 is an enlarged central vertical section taken at line 3—3 in Fig. 2.

Fig. 4, shows said trap in slightly modified form employing the teachings of this invention.

In particular, in Fig. 3, of the drawing, the tubular structure shown, is a trap or vessel for holding a fluid, and through which, fluids may pass. This device comprises three upwardly extending tubular members or branches numbered 15, 16, and 17, which are joined communicatively at their lower ends. The open top end 18 of branch 16, serves as the intake opening, while at the top end of the branch 17, there is an opening 19, which serves as the discharge opening of the trap. The direction of flow of fluid entering, should be substantially vertical, while the direction of the fluid discharged, should be substantially horizontal, or preferably outwardly downwardly. Below the opening 18, and preferably substantially at a region in line with the opening 19, the upper end of the branch 15, is joined communicatively to and with the preferably vertical branch 16. Intermediate the communicative junctions of the by-pass tube or branch 15, within the intake branch 16, is a strainer member 20, which preferably is made removable, and may be adapted to sit upon the lugs 21, which extend inwardly from the wall of the branch 16. It is evident that when some fluid is within the device, it will rise to an identical level in all the three branches 15, 16 and 17. For cleaning purposes, I preferably include a removable plug 23 in the wall at the bottom of the vessel, and a similar plug 22 in the wall of the intake tube 16, at a position, a little above the plane of the strainer member 20. When this plug 22 is removed, any foreign substances intercepted by the strainer 20, can be removed, and the opening for said plug may be of sufficient size to permit withdrawal and replacement of said strainer member.

In normal operation, fluids will enter at 18, from sink 24 or other structure, pass down the tubular branch 16, through the strainer 20, upon which will fall and be retained any solid substances, and said fluid will continue up through the exhaust branch 17, and will leave the trap through the discharge opening 19. It is preferred that the interior diameters of the branches shall be large enough to conveniently receive a greater flow than the liquid normally entering same, so that no incoming fluid will in normal operation flow through the by-pass branch 15. When liquid ceases to flow through the system, the fluid remaining in the trap, will assume an identical level along the line of the lowest point of the discharge opening 19, in all the three branches 15, 16 and 17, thereby maintaining a constant water seal in the system, and there will be a substantial water column above the surface of the strainer 20; thus keeping any solid matter intercepted by the strainer, below water. Any refuse collecting on the strainer will thus be water sealed, and no obnoxious odors and no gases or air will emit through the intake opening 18 of the trap.

In the event passage through intake tube 16 is obstructed, the fluid will flow through the by-pass tube 15, and thence out through branch 17. It is to be noted that the water seals in the system are always maintained.

It is evident that solid articles accidentally drawn down the drain pipe, will fall due to gravity into the tube 16, will not pass out of the trap into the piping system, and may be retrieved if valuable, or cleaned out if refuse.

In Fig. 4, the by-pass member 15' is communicative with the intake branch 16, immediately below the strainer 20. The mode of operation is identical as above described.

This invention is capable of numerous forms and various applications without departing from the essential features herein disclosed. It is therefore intended and desired that the patent shall cover whatever features of patentable novelty exist in the invention disclosed, and therefore the embodiments described shall be deemed illustrative and not restrictive. Reference is therefore had to the following claims rather than to the specific description herein to indicate the scope of this invention.

I claim:—

1. In a device of the character described, a vessel structure comprising two upwardly extending tubular members; said members being communicatively joined at their lower ends and open at their upper ends whereby the structure may be interposed in the drain pipe line leading from a plumbing fixture, a strainer member mounted within one of said members to partition the structure into two sections, and a third tubular member positioned below the fixture communicatively joined at its ends to the respective sections.

2. In a device of the character described, a vessel structure comprising three upwardly extending tubular members; said members being communicatively joined at their lower ends and two of said members being open at their upper ends whereby the structure may be interposed in the drain pipe line leading from a plumbing fixture, and a strainer member mounted across the interior of one of the tubular members having an open end; the upper end of the third of said tubular members, being positioned below the fixture and communicatively joined above the strainer member, with the tubular member containing the strainer member.

GEORGE M. CALL.